United States Patent
Krieger (10) Patent No.: US 6,477,914 B1
(45) Date of Patent: Nov. 12, 2002

(54) MOTION ALARM

(75) Inventor: Daniel J. Krieger, Bismarck, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/624,373

(22) Filed: Jul. 24, 2000

(51) Int. Cl.$^7$ ............................................... G05G 1/00
(52) U.S. Cl. .................. 74/491; 74/471 XY; 180/6.48; 137/636.2; 200/337; 340/425.5
(58) Field of Search ........................ 74/471 XY, 491; 200/337, 335, 332; 180/9.1, 6.48

(56) References Cited

U.S. PATENT DOCUMENTS

| | | | |
|---|---|---|---|
| 3,429,290 A | 2/1969 | Harris | 116/60 |
| 3,569,655 A | * 3/1971 | Jakubauskus | 200/172 |
| 3,789,177 A | * 1/1974 | Carpenter et al. | 200/172 |
| 3,800,615 A | * 4/1974 | Pilch | 74/471 |
| 3,818,438 A | 6/1974 | Stacha, Jr. | 340/70 |
| 3,827,024 A | 7/1974 | Anderson et al. | 340/70 |
| 4,043,416 A | * 8/1977 | Albright et al. | 180/6.48 |
| 4,063,217 A | 12/1977 | Hyde et al. | 340/70 |
| 4,088,857 A | 5/1978 | McCoige | 200/61.88 |
| 4,128,827 A | 12/1978 | Coleman et al. | 340/52 R |
| 4,250,486 A | 2/1981 | Kiefer et al. | 340/52 R |
| 4,310,078 A | * 1/1982 | Shore | 477/1 |
| 4,363,249 A | 12/1982 | Stugart | 74/850 |
| 5,737,993 A | 4/1998 | Cobo et al. | 91/361 |
| 6,025,778 A | 2/2000 | Dietz et al. | 340/463 |

* cited by examiner

Primary Examiner—David A. Bucci
Assistant Examiner—Timothy McAnulty
(74) Attorney, Agent, or Firm—Nickolas E. Westman; Westman, Champlin & Kelly (57) ABSTRACT

A pilot valve control for the drive motors of an excavator utilizes four pilot valves, each of which has a linear actuable plunger. A control body having a cam type member is mounted on a universal swiveling connection so that in a centered position none of the plungers are moved to actuate the respective valves, but upon tilting of the control body the plungers are actuated. A motion alarm actuator is connected to the control body and is associated with a normally closed switch so that in a centered position of the control body the normally closed switch is held open, but when the control body moves to any one of its positions actuating a pilot valve, the switch, which forms an alarm switch, moves to its normally closed position.

14 Claims, 9 Drawing Sheets

MOTION ALARM

CROSS REFERENCE TO RELATED APPLICATION

Reference is made to U.S. patent application Ser. No. 09/503,573, filed Feb. 14, 2000, for CONTROL FOR DRIVE MOTORS FOR A SELF-PROPELLED MACHINE, the content of which is hereby incorporated in its entirety by reference.

BACKGROUND OF THE INVENTION

The present invention relates to a mechanical motion alarm actuator that utilizes a single switch and an actuator on a multi valve pilot valve control and wherein the switch is engaged and opened in the neutral position of the pilot valve control only. This alarm actuator is particularly useful in signalling any movements of the vehicles or machines that are caused by movement of the pilot valve actuating system to warn of such movements. The actuator is illustratively disclosed in connection with earth working excavators which use pilot valve controls for controlling movement and steering of the frame of the excavator.

At the present time excavator motion alarms usually use at least two switches, one for each travel lever or travel linkage. The switches are normally open when the travel levers are in neutral, and when either or both of the levers are actuated, either one or both of the switches close, which activates the alarm. Since the upper structure of an excavator can be rotated 360°, a motion alarm is required to activate for any ground drive movement of the excavator, namely forward, reverse, and left or right turning movement, and is distinguished from a "backup" alarm. An alarm should sound at any time when the excavator is moved along the ground, in that what might be forward movement at one time can be reverse at another time, when the cab has been rotated 180° relative to the propelling tracks.

Joystick movement indicators have been advanced. U.S. Pat. No. 5,737,993 shows an electronic arrangement whereby a sensor senses the position of the joystick and generates an operator command signal that is in effect a velocity signal.

Various back-up alarms also have been utilized, which will sense the position of a transmission element, or sense a position of an actuator element, to provide a single signal when a unit is placed into reverse. Such reverse or back-up warnings are common on industrial equipment and large trucks.

Pilot valves that are operated by mechanical controllers are used on earth working excavators, and mounting a motion alarm switch and actuator to insure that the alarm is activated whenever the controller is moved from its neutral position has been difficult. Movement of individual control levers can be sensed, but that requires two switches, as previously explained.

SUMMARY OF THE INVENTION

The present invention relates to a motion alarm actuator that provides mechanical activation of the alarm in any working position of a multiposition, multifunction control. No warning is provided in a neutral position.

In the present invention a single switch is mounted adjacent a pilot actuator or control with the switch having a roller at the end of an actuator arm. The switch is operated by an actuator member on the pilot actuator, which preferably also has a roller engaging the switch roller in neutral position, and mounted so that movement of the actuator member as the pilot control member is moved to initiate a drive in any direction, will disengage from the switch roller. The switch closes to provide the alarm signal. The alarm switch is closed whenever the pilot control member moves from its neutral position. The roller on the actuator member that moves with the pilot control provides a smooth reengagement with the switch roller to cause the switch to be opened when the pilot valve control member moves back to its neutral position, without binding, and without bending of parts, using a very simplified mounting. The pilot control is disclosed as and will be described as a pilot valve control.

DETAILED DESCRIPTION OF THE ILLUSTRATIVE EMBODIMENTS

Figure 1:
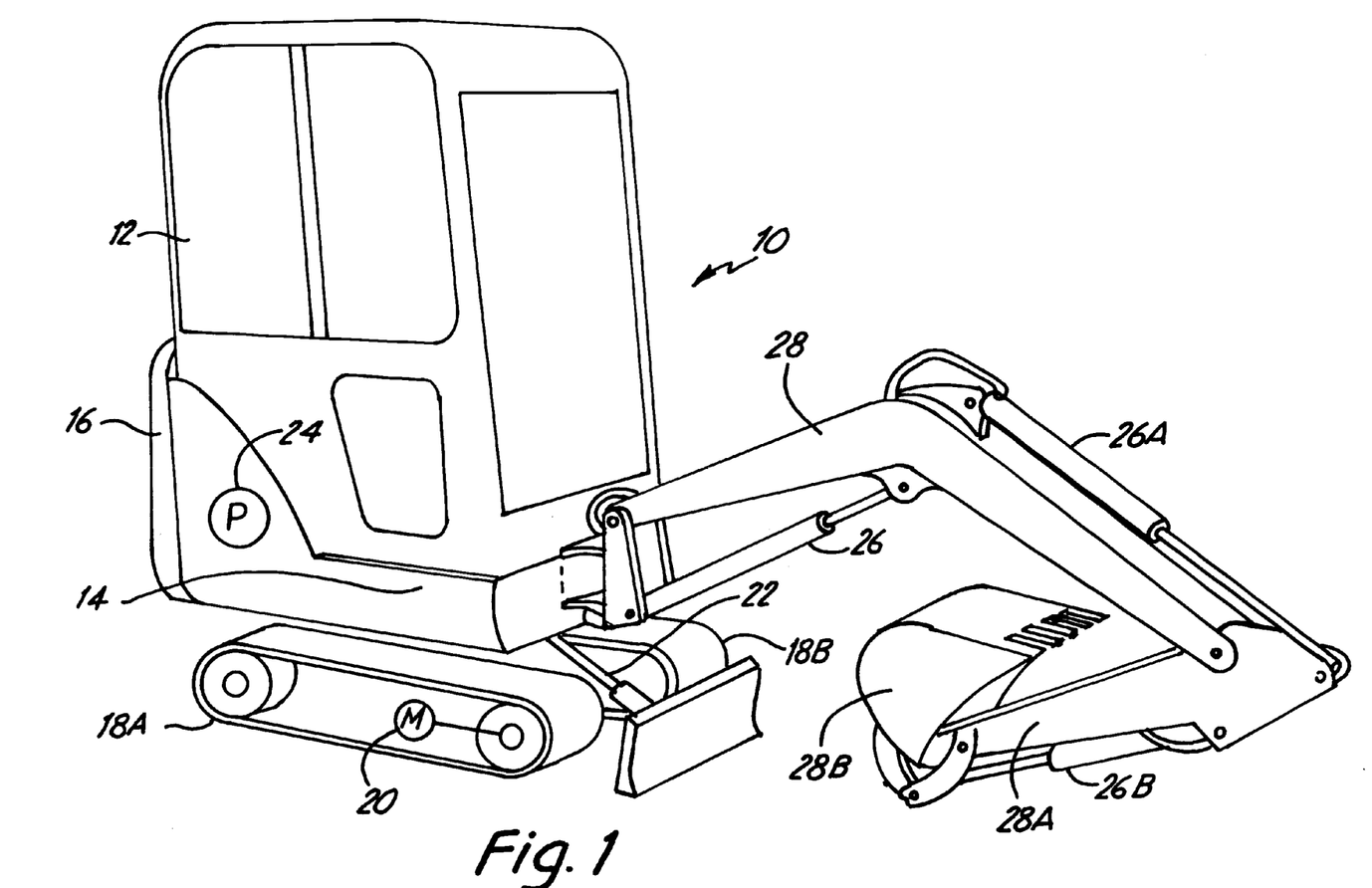
FIG. 1 is a schematic representation of a typical excavator utilizing a control system having an alarm actuator of the present invention installed thereon.

FIG. 1 illustrates an excavator 10 of typical configuration showing an implement or machine on which the present alarm arrangement is mounted. The excavator 10 includes a operator cab 12 that has a support platform 14, and an engine compartment 16 in which an engine (not shown) is mounted. The excavator has an undercarriage including drive tracks 18A and 18B, which are mounted on suitable sprockets and axles, and which are driven by hydraulic motors 20 and 22, shown schematically. The motors could also be electric, and controlled by a multiple switch assembly.

The tracks 18A and 18B on opposite sides of the excavator are used for driving the excavator along the ground and for steering. The excavator can be turned right and left, by selectively driving the motors 20 and 22, which can be driven in forward and rearward directions. The engine in the engine compartment 16 is used for driving various components including a hydraulic pump 24 that will provide hydraulic pressure not only for the drive motors 20 and 22, but also for operating actuators such as the actuator 26 for a boom 28, and other actuators 26A and 26B for a dipper arm 28A and a bucket 28B in a conventional manner. The platform 14 and the cab 12 also can be rotated continuously about an upright axis with a suitable drive motor. Since the boom can be extending to either end or the sides of the frame carrying the tracks 18A and 18B, an alarm is needed whenever one or both of the motors 20 or 22 are powered.

The boom, dipper and bucket are operated in a normal manner, and usually these will be controlled by a conventional joystick control comprising a single handle control for the various functions of the boom and bucket.

Typically, the operator compartment 12 will have the operator drive traction controls in the form of either hand levers or foot pedals with one control lever for the drive on each side acting to control a single pilot valve actuator. The use of pilot operated valves operated from a single actuator requires motions in several directions of tilting from a neutral position and each motion should sound an alarm.

Figure 2:
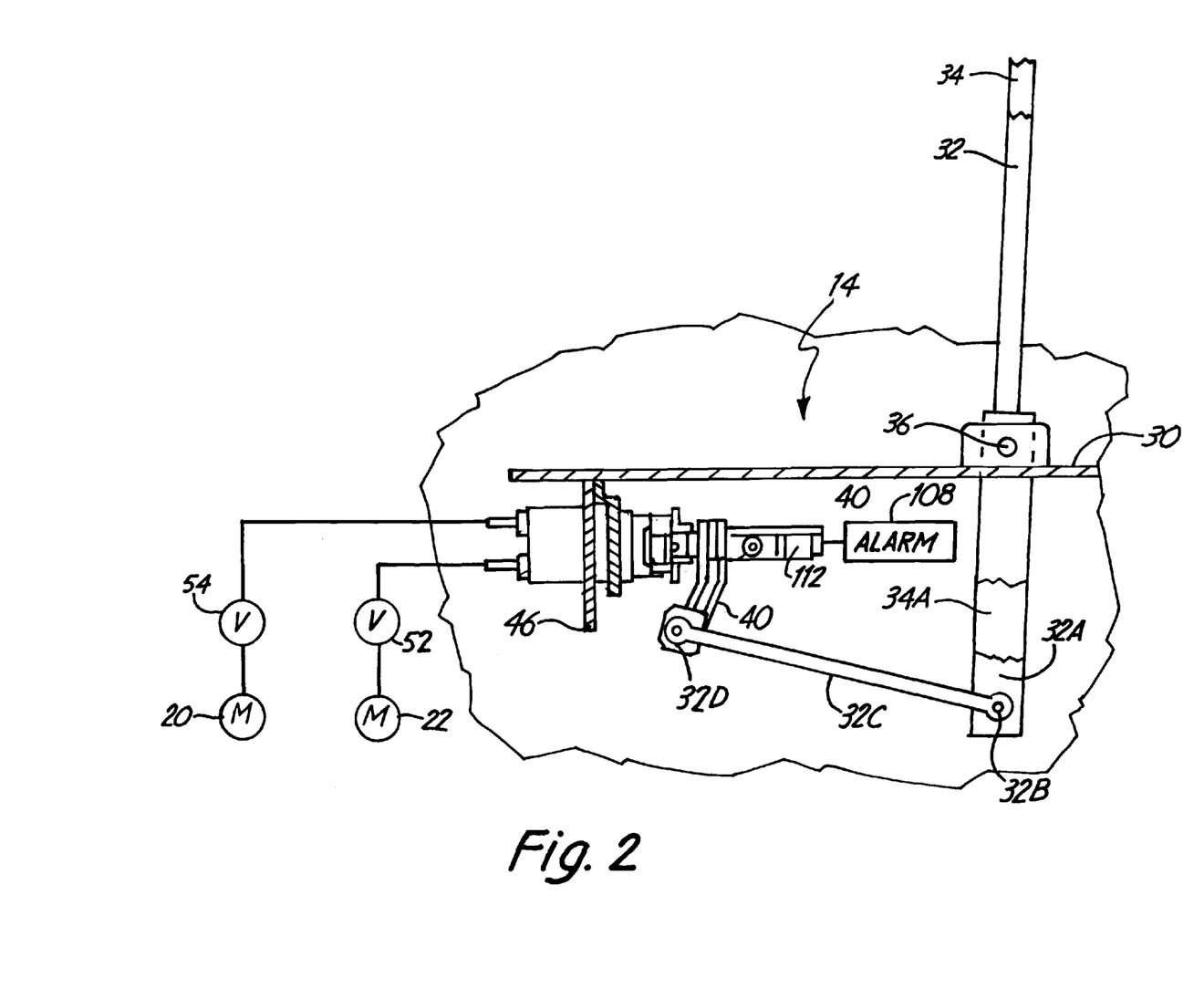
FIG. 2 is a schematic side sectional view of an interior of an operator's compartment of an excavator schematically showing linkage for operating a pilot valve control, including an alarm actuator of the present invention.

The primary description in this application will be in relation to the use of operator hand levers that are mounted, as schematically shown in FIG. 2, on an operator's platform floor plate 30 on the operator's platform 14. A joystick control also can be used. The levers indicated at 32 and 34, respectively, are used for controlling the right and left motors 20 and 22, to selectively control the drive to the tracks 18A and 18B.

Figure 3:
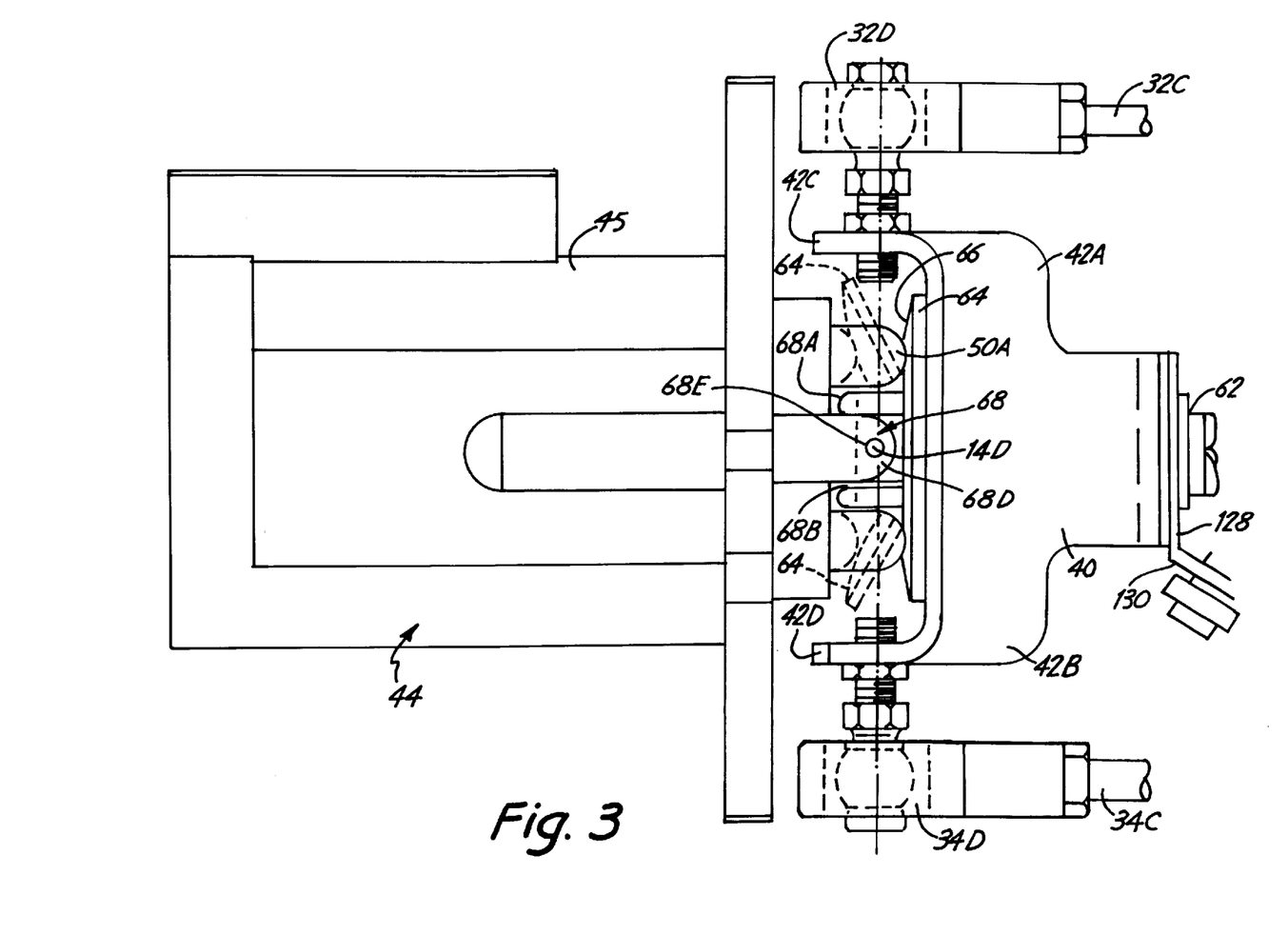
FIG. 3 is a bottom plan view of the pilot valve control on which the backup alarm actuator of the present invention is installed.

The levers 32 and 34 are spaced apart and are pivotally mounted on a common axis on suitable supports on the plate 30 about pivot pins shown schematically at 36. The levers are individually controllable by moving the upper ends in fore and aft directions from a center neutral or rest position about the axes of pins 36. The levers in turn move actuator arm ends 32A and 34A respectively which are connected through spherical swivel rod end joints 32B and 34B to links or rods 32C and 34C. The links or rods 32C and 34C in turn have spherical rod ends 32D and 34D at their outer ends, which connect to arms 42A and 42B of a cam plate 40 (see FIGS. 3 and 5). As can be seen, the links 32C and 34C are spaced apart, and the arms 42A and 42B (see FIGS. 3 and 6) include ears 42C and 42D on which the spherical rod end bearings 32D and 34D, respectively, are mounted.

A standard pilot valve assembly 44 is mounted onto a plate 46 fixed to the excavator platform 14. As shown, the pilot valve assembly 44 has a body 45 and four pilot pressure control valves that are operated through spring loaded plungers, including plungers 48A, 48B, 50A and 50B. The pilot valves and plungers form a square pattern with the plungers located at the corners of the square pattern. Plungers 48A and 48B are used to operate the left side motor 22 for the left hand tracks 18B. The plunger 48A is the pilot valve for left forward (LF), and plunger 48B is the pilot valve of reverse (LR). Plungers 50A and 50B are used for controlling the right side motor 20 and driving the right track 18A. The plunger 50A is the pilot valve for right forward (RF) and plunger 50B is the pilot valve for right reverse (RR). The pilot valves operate hydraulic valve controls 52 and 54 (schematically shown in FIG. 2) that control rotation, and direction of rotation, of the motors 20 and 22.

The pilot valves that are operated by the plungers 48A, 48B, 50A and 50B, are used conventionally with joystick controls for various hydraulic circuits.

The cam plate 40 is mounted onto a pilot valve operating disk actuator or valve control assembly 58, that has a center control body 60 on which the cam plate 40 is securely mounted with a cap screw 62. An alarm actuator assembly 59 is also secured in place on the body 60 with the cap screw 62. The control assembly 58 includes an annular actuating or valve control flange 64 at the inner end of the center body 60 that engages the hemispherical ends of the plungers 48A, 48B, 50A and 50B. The annular flange 64 has a rounded or tapered undersurface 66 that will ride against the part spherical ends of the plungers to provide actuation of the plungers axially inward when the valve control assembly 58 is tilted against a spring load that loads the plungers outwardly.

Figure 5:
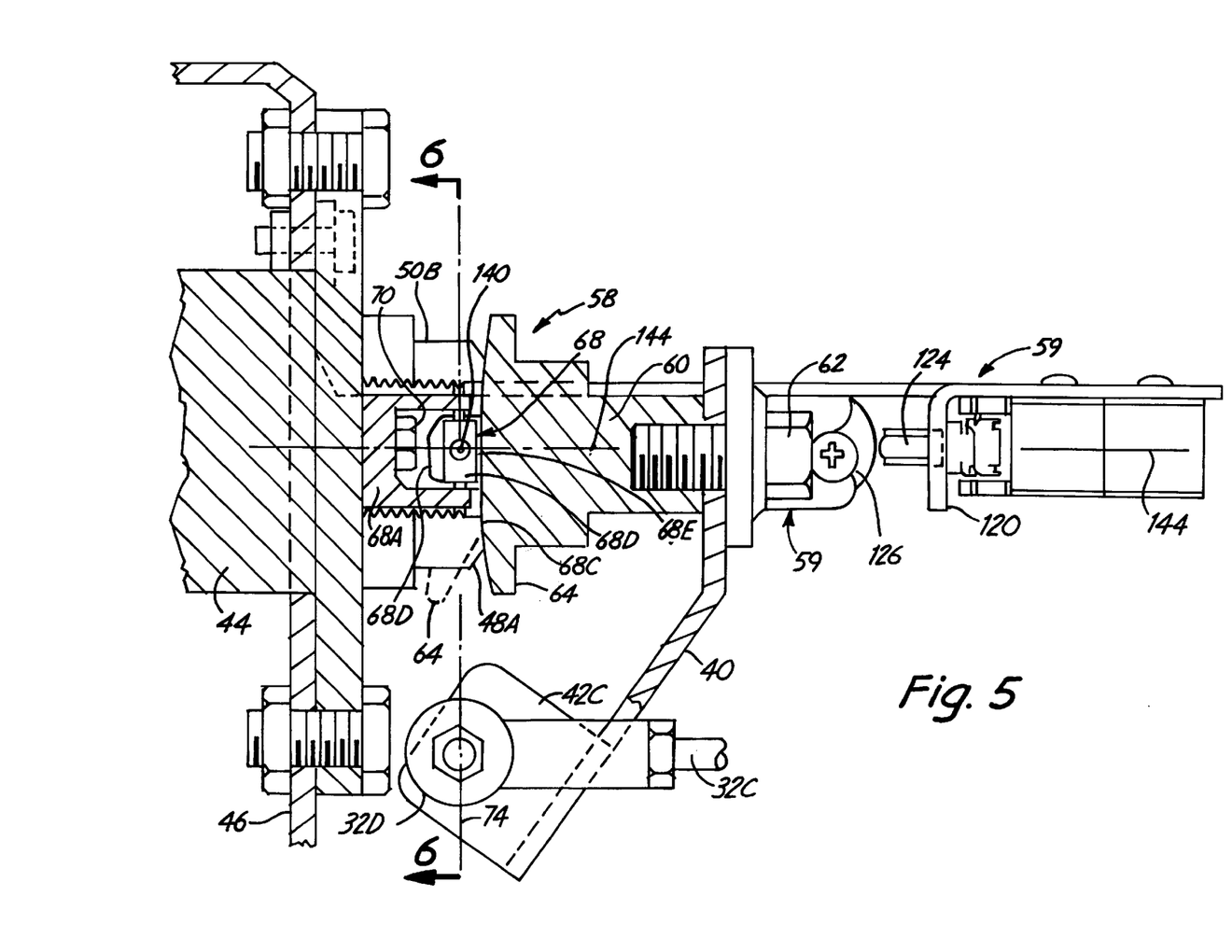
FIG. 5 is a sectional view taken as in line 5—5 in FIG. 4.
Figure 6:
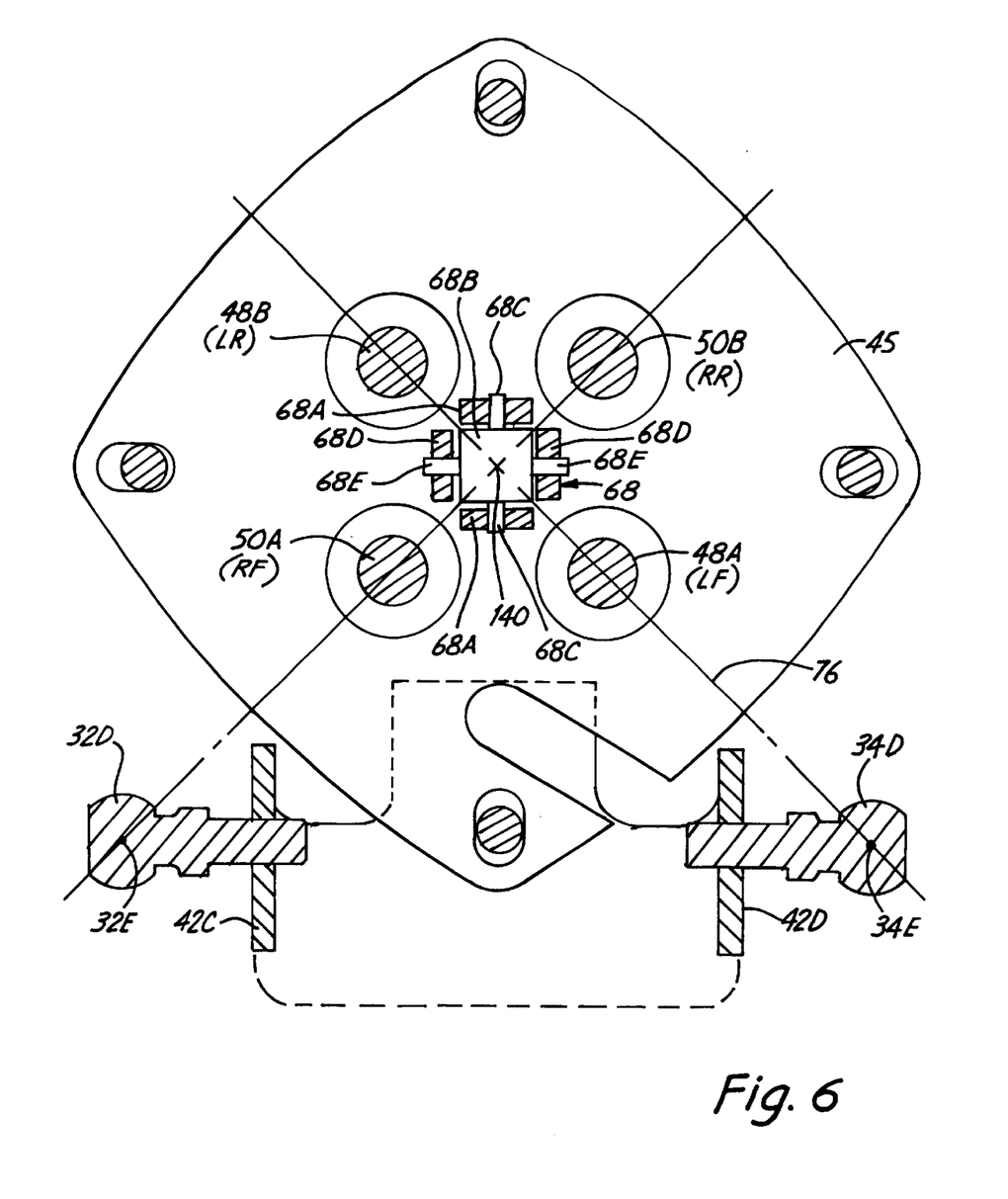
FIG. 6 is a sectional view taken as in line 6—6 in FIG. 5.

The control assembly 58 is mounted to the pilot valve body 44 through a universal swivel joint or spherical joint indicated generally at 68 (FIGS. 5 and 6). This swivel joint, as shown, is a universally pivoting joint having a center of swivel 140. The swivel joint includes a first yoke 68A that is fixed to the valve body 44 with a cap screw 70 (FIG. 5). The yoke 68A pivotally mounts a swivel block 68B on suitable pivot pins 68C. A second yoke 68D is fixed to the center control body 60 that supports the flange 64, and yoke 68D is pivotally mounted to the block 68B on pins 68E, which are on an axis perpendicular to the axis of pivot pins 68C.

The universal joint 68 permits universal pivoting of the valve control assembly 58 about the swivel center 140, which is at the intersection of mutually perpendicular axes of the pins 68C and 68E. When the valve control assembly 58 tilts, the valve control flange 64 will tilt and a section of the flange 69 will depress one or more of the plungers 48A, 48B, 50A and 50B under control of the levers 32 and 34. This tilt of the valve control flange is illustrated in dotted lines in FIG. 5.

The center points 32E and 34E of the part spherical balls of rod ends 32D and 34D that mount onto the cam plate arms 42 and 42A are positioned to permit the desired actuation of the plungers. The center points 32E and 34E of the spherical joints lie on the plane 74 that is defined by the axes of the pins 68C and 68E of the universal joint 68 when in a centered or reference position. This is illustrated in FIG. 5.

Additionally, in order to obtain the needed motions, the center points 32E and 34E of the part spherical rod ends 32D and 34D lie along the lines that pass diagonally across the centers of the plungers at the opposite corners of the valve body and through the center 140 of swivel of universal swivel joint 68. For example, as shown in FIG. 6, a line 76 passes through the center axis of the plunger 48A, the center axis of the plunger 48B, the swivel center 140 of the universal or swivel joint 68 and through the swivel center or center point 34E of the spherical rod end 34D. A line 78 passes through the center axis of the plunger 50A, the center axis of the plunger 50B, the swivel center 140 of the universal or swivel joint 65 and the swivel center or center point of the spherical rod end 32D.

The control motions can be explained by first referring to FIGS. 2, 5 and 6. When both of the manual levers 32 and 34 are pulled rearwardly, the links 32C and 34C will be placed under tension and will pull the arms 42A and 42B of the cam plate 40 in the direction that is indicated by the arrow 80 in FIG. 4. This will swivel the valve control flange 64 about the swivel center 140 of universal swivel joint 68 to depress both of the plungers 48B and 50B, and both of the motors 20 and 22 will drive the respective tracks 18A and 18B in reverse so that the implement or machine, as shown an excavator, will move rearwardly.

If both of the levers 32 and 34 are pushed forwardly, the links 32C and 34C will be planed under compression, and the arms 42A and 42B of the cam plate 40 will move in an opposite direction from the arrow 80 and will cause the plungers 48A and 50A to be depressed simultaneously, thereby operating the main valves 52 and 54 to drive the motors 20 and 22, and causing the tracks 18A and 18B to drive the excavator in forward direction, without turning.

Figure 7A:
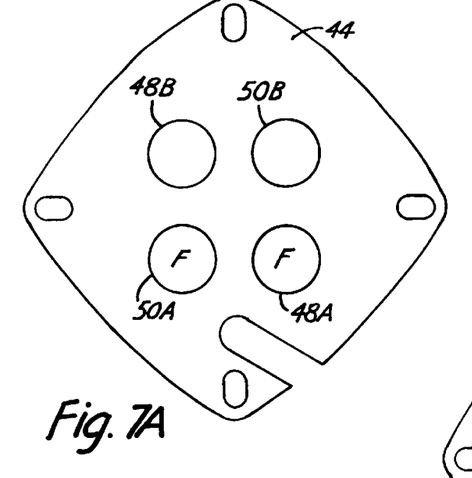
FIGS. 7A through 7D are illustrative end views similar to FIG. 6 showing the positions that the pilot valve control member can take, and each of which positions requires activation of the alarm of the present invention.
Figure 7B:
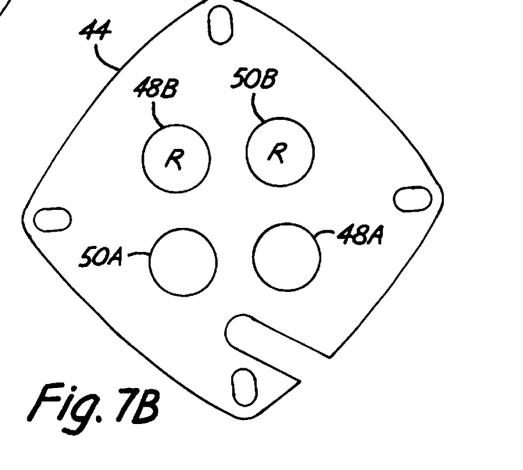

Referring to FIGS. 7A and 7B, the forward and reverse drive plunger positions are illustrated. In FIG. 7A, the plungers 48A and 50A are marked with an "F" in that those plungers are moved inwardly for forward direction. In FIG. 7B, the plungers 48B and 50B are marked with an "R" indicating that they are actuated inwardly to cause rearward movement of the excavator when the excavator frame is oriented in the reference position.

Figure 7C:
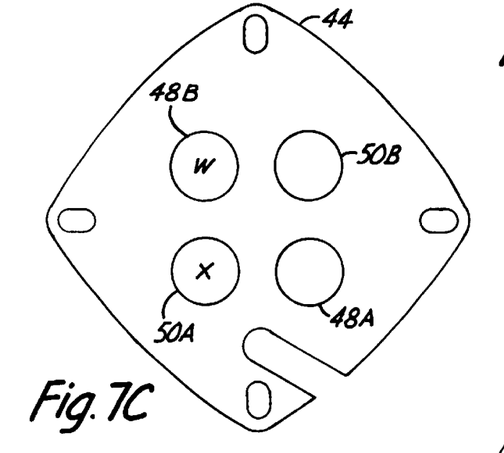

If only the lever 32 is pushed forwardly, the link 32C would push on the cam arm 42A, and this causes a tilting pivoting of the cam plate 40 about the swivel center 140 of universal swivel joint 68, but since the spherical rod end 34 remains stationary, the cam plate 40 would also pivot about swivel center point 34E, and would cause the plunger 50A to be depressed as indicated by the X in FIG. 7C. The drive would then be forward on the right side motor 20 driving track 18A to cause turning to the left of the machine with only the right track being driven and the other track remaining stationary.

The same direction of turn can be obtained by reversing the left hand drive motor for the left hand drive track. With lever 32 in neutral or centered position the lever 34 would be pulled back, placing tension on the rod 34C, pulling on arm 42B and rocking the cam 40 about the swivel center point 32E of rod end 32D and the swivel center 140 of joint 68 to depress plunger 48B which is indicated with a W in FIG. 7C.

A left turn can be made by driving the right hand track forwardly or by actuating the plunger 48B and driving the left hand track rearwardly. To accelerate the rate of turn, one track can be driven forwardly and one track rearwardly at the same time. The pivoting on the spherical ball joints of the rod ends when the actuation is being carried out, so that for example if the turn is to the left, and the left hand reverse plunger 48B is depressed, the right hand forward movement plunger 50A also can be depressed, by pushing the lever 32 forwardly. The cam plate then tilts to the left in FIGS. 7A–7D about the swivel center 140 of universal swivel joint 68 to depress both plungers 50A and 48B simultaneously (labeled "W" and "X" in FIG. 7C).

Figure 7D:
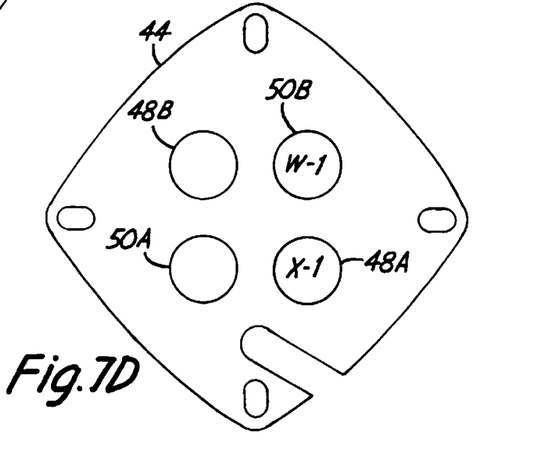

If it is desired to turn to the right, the lever 32 can be pulled rearwardly to cause plunger 50B to be depressed to reverse the right track 18A (labeled "W-1" in FIG. 7D), or lever 34 can be moved forwardly to depress plunger 48A and drive the left track forwardly (labeled "X-1" in FIG. 7D).

To turn right at a higher rate, or a tighter turn, in addition to running the right motor in a rearward direction, the left forward plunger 48A can be depressed by pushing the lever 34 to the front, at the same time the lever 32 is pulled rearwardly to tilt the disk 64 to drive the tracks 18A and 18B in opposite directions. The cam plate would tilt to the right side in FIGS. 7A–7D about the swivel center of universal swivel joint 68 (labeled "W-1" and "X-1" in FIG. 7D).

The action of the cam plate permits nine modes of operation, namely: (a) stopped or neutral; (b) both tracks driven forwardly; (c) both tracks driven rearwardly; (d) right track forward; (e) right track reversed; (f) left track forward; (g) left track reversed; (h) left track forward and simultaneously right track reversed; and (i) right track forward and left track reversed.

In order to provide a low cost travel alarm actuator that will provide a signal initiating some type of alarm, generally an audible alarm indicated at 108, the alarm actuator assembly 59 is used in connection with an alarm switch assembly 110 shown in FIGS. 4, 5, 8 and 9. The switch assembly 110 comprises a normally closed switch 112 that is mounted onto a bracket 114 which in turn is attached to the bracket 46 in a suitable manner. The bracket 114 has a base leg 116 and an angle support leg 118 that positions the switch outwardly beyond the cam plate 40. The leg 118 has a bent down flange 120 that shields a switch actuator arm 122. The arm 122 has a roller 124 mounted at an outer end. This is a micro switch that closes when the arm is free to move under its spring load. When the roller 124 is in the position shown in FIG. 4 where it is engaging a roller 126 on its full diameter (see also FIG. 5) that is mounted on a bracket 128 forming part of the alarm actuator assembly 59, the switch 112 is open and there is no alarm being sounded. The switch 112 is thus a normally closed switch.

Figure 4:
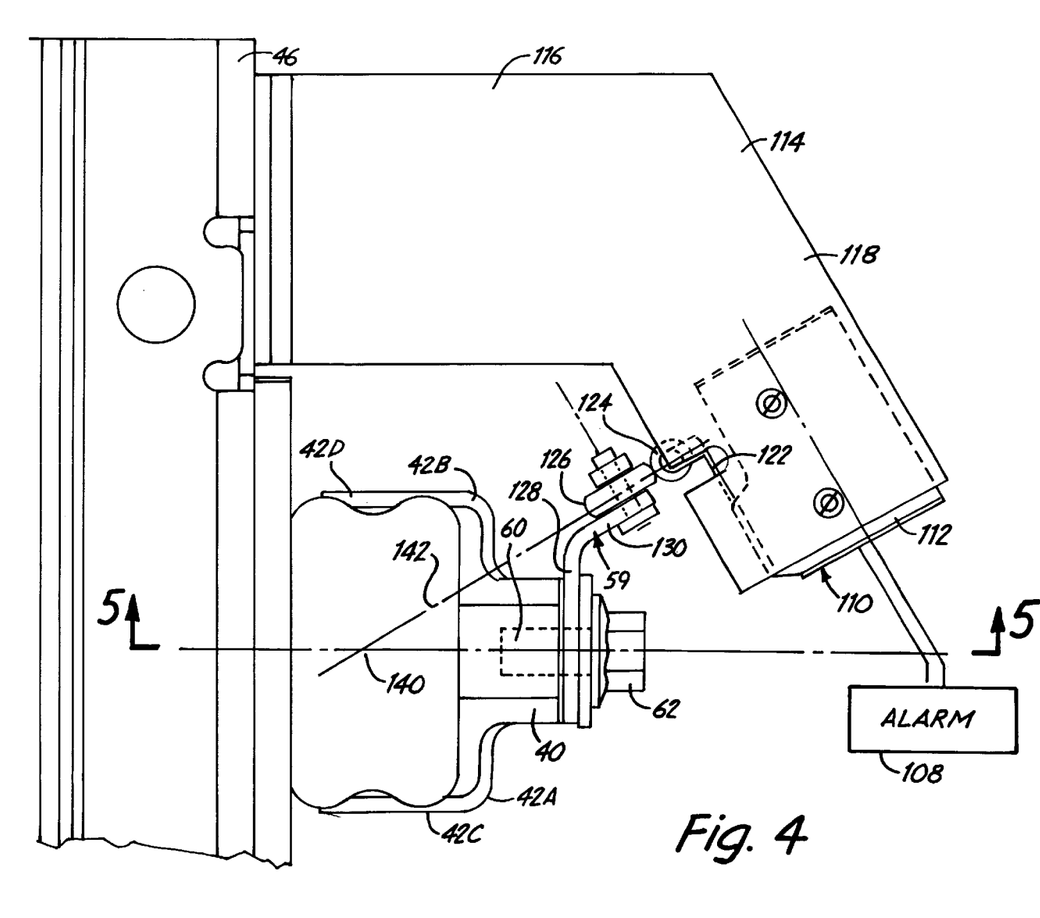
FIG. 4 is a top plan view of the pilot valve control in the neutral position and with the alarm actuator actuating a switch for the alarm of the present invention.

The alarm actuator assembly 59 includes the bracket 128 that has an angled arm 130 on which the roller 126 is rotatably mounted. The axis of the roller 126 is perpendicular to the axis of the roller 124, and in the neutral position of the cam plate 40, the valve control body 60 and the flange 64, shown in FIG. 5, when none of the plungers are depressed, the axis of the roller 126 lies on a plane passing through the axis of pins 68E of the universal joint 68 and bisecting the roller 124. The bisecting plane of the roller 126 (perpendicular to the axis of the roller 126) passes through the axis of the roller 124 in the neutral position as well, as illustrated in FIG. 4. The alarm actuator assembly roller 126 is offset from the center of the cam plate 40 and the actuator or valve control body 60, so that any tilting motion of the valve control body 60 caused by moving the cam plate 40 and resulting in pressing one or more of the plungers 48A, 48B, 50A and 50B, will cause a movement of the arm 130 sufficient to move the roller 126 away from the roller 124. The roller 126 moves a sufficient amount so that the switch 112 is closed. This actuation of the switch 112 will occur in each of the 8 positions (other than the neutral position) outlined above when one or more of the plungers are actuated. The actuator bracket and roller 126 will keep the switch open when the pilot valve control body or actuator body 60 is in the neutral position. For example, when the valve control flange 64 is tilted to its dotted line position shown in FIG. 5 by moving the cam plate 40 in response to movement in both of the actuator rods, the roller 126 will move to its dotted line position and the roller 124 will be free to move outwardly, thereby closing the switch 110 and activating the alarm 108, whether a bell, horn, beeper or a light. In the position of the valve control flange 64 shown in dotted lines in FIG. 5, both the plungers 48A and 50A would be actuated.

In each of the other positions, the shifting of the valve control body 60 and valve control flange 64 will result in motion of the roller 126 sufficient to permit the roller 124 to move to actuate the switch 112 by permitting it to move to its normally closed position.

Figure 8:
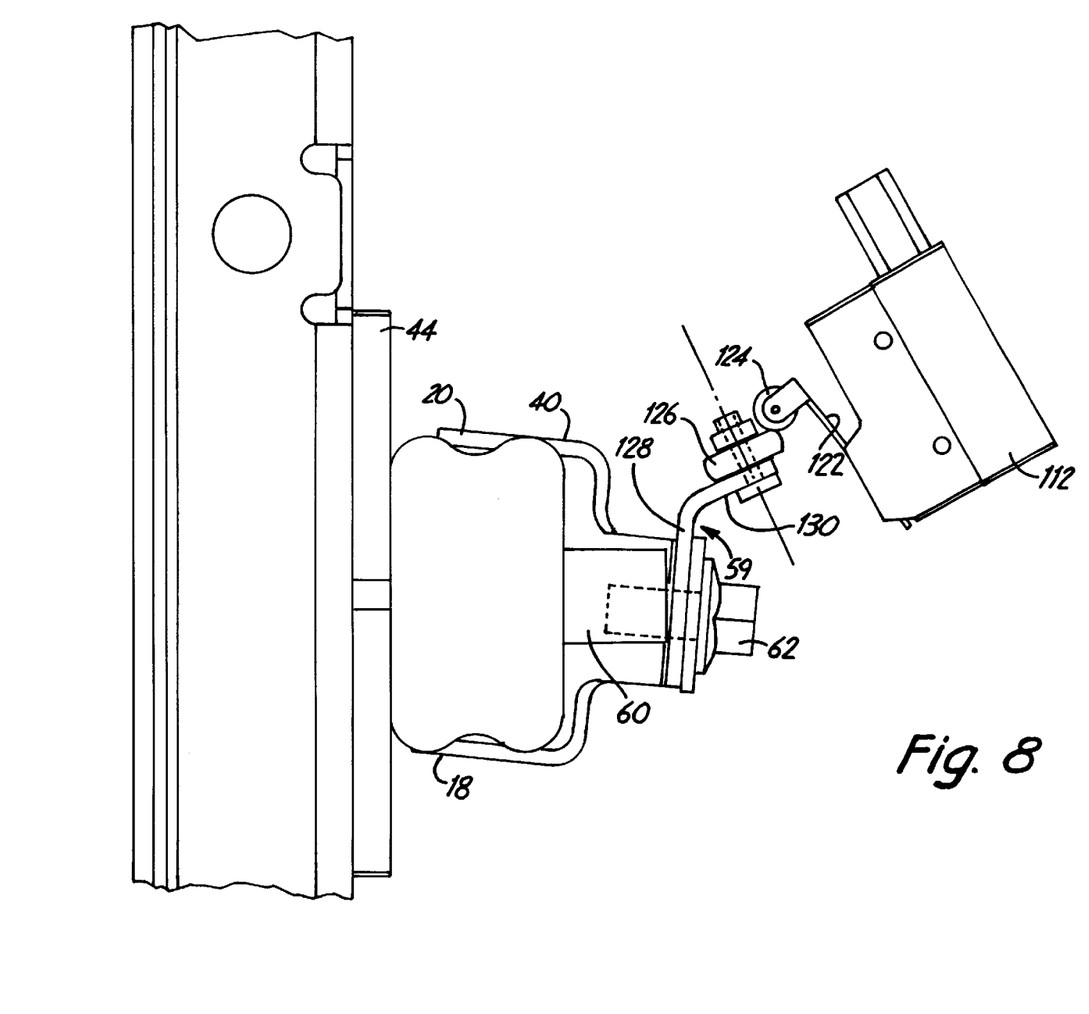
FIG. 8 is a schematic top view illustrating the pilot valve control member positioned in a right hand turn position permitting the alarm to be activated.
Figure 9:
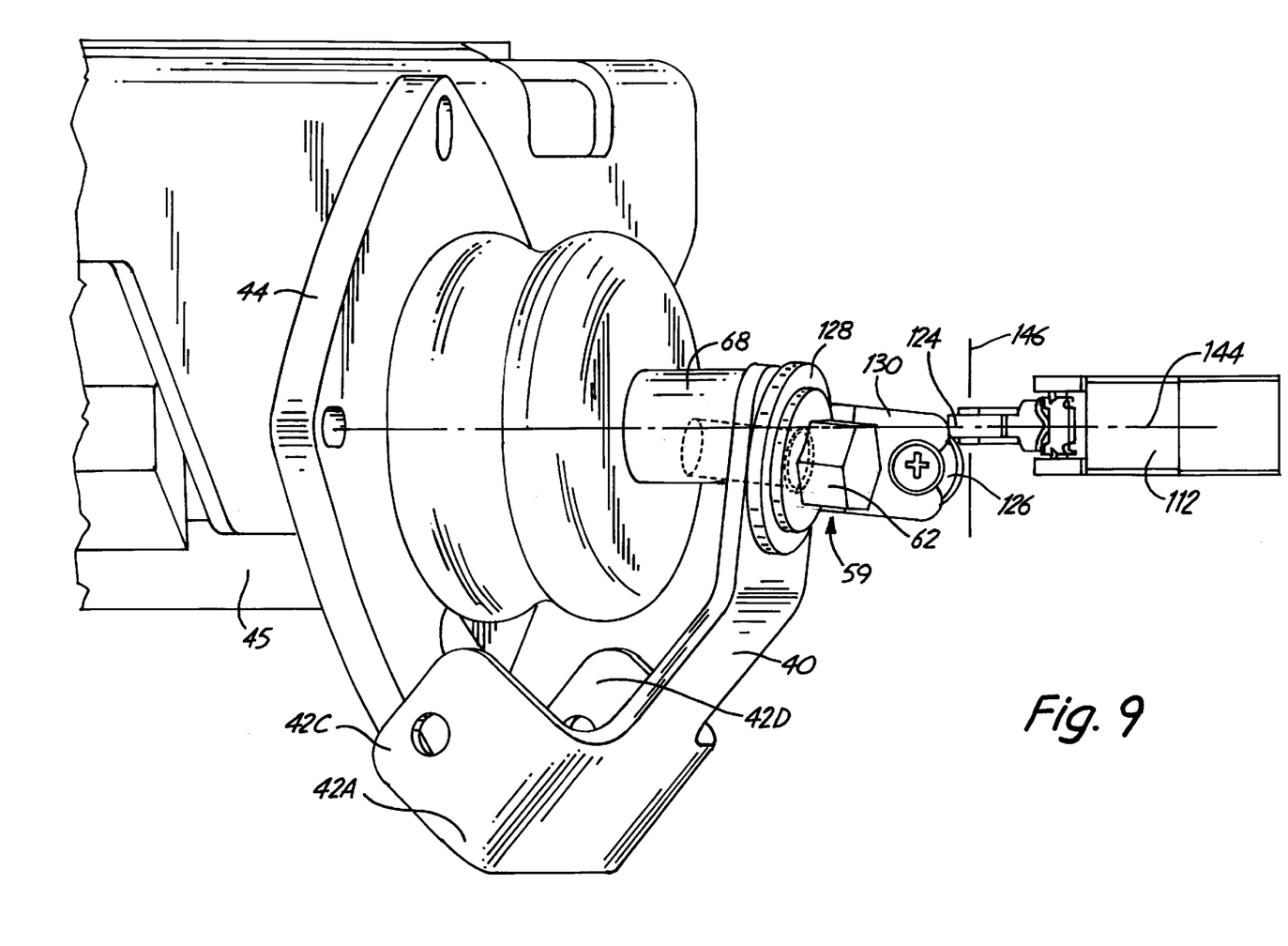
FIG. 9 is an illustrative view in a forward drive position of the pilot valve control member, also permitting the alarm to be actuated for purposes of illustration.

FIGS. 8 and 9 illustrate such actuations. In FIG. 8, the cam plate 40 has tilted the valve control body 60 so that the roller 126 has moved laterally of the roller 124 and the switch 112 is closed. This would be tilting the valve control flange 64 about an upright axis as shown in FIG. 8 and actuating both of the plungers 48B and 50A.

In FIG. 9, a showing is made for actuating only one of the plungers, namely the plunger 50A, by tilting the cam plate 40 and moving it downwardly to its corner position so that the roller 126 moves below the roller 124 and the switch 112 closes as it moves to its spring loaded normal position.

Pivoting movement of the valve control body 60 is sufficient to permit switch closing or switch actuation in each of the 8 positions of the valve control body, other than neutral or center position.

As shown in FIG. 4, in the neutral or center position, the axes of the rollers 126 and 124 are mutually perpendicular, and the axis of the roller 124 lies on the bisecting plane of the roller 126 (which plane is perpendicular to the axis of roller 126), and this plane 142 intercepts the axis of pivot of the actuator. The axis of pivoting is the center point 140 of the universal joint 68 that is used for the valve control body or actuator 60, as illustrated. The plane described provides for the correct positioning of the rollers at the neutral or center position of the valve control body 60 where the switch 112 is opened.

As the actuator roller 126 is shifted by the tilting of the valve control body, the roller 126 will move off the roller 124 sufficiently so that the roller 124 springs outwardly and the switch moves to go to its normally closed position.

Looking at the illustration in FIG. 9, it can also be seen that the bisecting plane 144 of the roller 124, which is perpendicular to the axis 146 of this roller includes the center pivot point 140 of the universal joint, or in other words the plane 144 also intersects the center point of pivoting of the cam plate.

The tilting shown in FIG. 9 is sufficient to cause the roller 126 to move downwardly and let the roller 124 move out to permit the switch 112 to move to its closed position. The positioning of the plane 144 in the neutral position also is shown in FIG. 5. It intersects the center of the pivot ears or pins 68E as shown.

Although the present invention has been described with reference to preferred embodiments, workers skilled in the art will recognize that changes may be made in form and detail without departing from the spirit and scope of the invention.

What is claimed is:

1. An actuator for providing actuation for drive motors of an industrial vehicle having a control body movable about a central pivot in swiveling motion, said control body having a centered position and swiveling from the centered position to cause actuation in a plurality of directions of movement about said center swivel, the control body being moveable manually in response to inputs from an operator, and an alarm actuator mounted on said control body and having an actuator member spaced from the center swivel outwardly from the control body, a switch mounted relative to the control body at a fixed location, the switch having an external actuator, said actuator member on said alarm actuator bracket engaging the external actuator when the control body is in a neutral position and moving away from the external actuator when the control body moves away from its neutral position sufficiently to cause actuation of the drive of the industrial vehicle.

2. The apparatus of claim 1, wherein said actuator member on said alarm actuator bracket comprises a first roller rotatably mounted about an axis.

3. The apparatus of claim 2, wherein said external actuator of said switch includes a second roller, said external actuator being spring loaded to a normal position with the switch closed, and the second roller of said switch external actuator rotating about an axis perpendicular to the axis of the first roller.

4. The apparatus of claim 3, wherein the axis of the second roller and the center of swivel of the control body lie on a plane substantially perpendicular to the axis of the first roller that bisects the first roller when the control body is in its neutral position.

5. The apparatus of claim 4, wherein the axis of the first roller and the center of swivel define a plane that is perpendicular to the axis of the second roller and substantially bisects the second roller of the switch when the control body is in the neutral position.

6. The apparatus of claim 1, wherein said control body is mounted relative to a plurality of plungers forming elements for operating the drive for the industrial vehicle, said plungers being positioned so that they are at an equal distance from the center of swivel in radial directions.

7. The apparatus of claim 6, wherein said plungers are positioned in a square pattern and comprise four plungers at corners of the square pattern, the plungers having actuating axes, and the planes defined by the actuating axes of plungers mounting at the diagonal corners of the square pattern passing through the center of swivel of the control.

8. The apparatus of claim 7, wherein said plungers comprise pilot valves used for controlling hydraulic motors for driving the industrial vehicle.

9. The apparatus of claim 1, wherein said industrial vehicle comprises an excavator having an operator platform that rotates about a vertical axis.

10. For use in combination with a pilot valve having four plungers operating along linear axes for in and out actuated movement from reference positions, the pilot valve controlling operation of drive motors for an industrial vehicle, the pilot valve having a universal swivel connection thereon, and a control body having a central axis mounted on the swivel connection and moveable from a centered position where none of the plungers are actuated, in selected directions about a center swivel point of the swivel connection to selected positions for individually actuating a plurality of the plungers, the pilot valve being mounted onto a frame, wherein the improvement comprises a vehicle motion alarm actuator including a switch supported relative to the frame at a location spaced from the control body, said switch being a normally closed switch having a spring loaded switch actuator moveable from a normal position to a position opening the switch, a switch actuator assembly mounted on said control body comprising an actuator bracket extending laterally from the control body central axis and having a first actuating roller at an outer end of the actuator bracket, said switch actuator having a second actuating roller thereon, the first actuating roller and the second actuating roller being rotatable about mutually perpendicular axes, and the first and second rollers engaging each other with the control body in a neutral position to hold the actuator arm in a position to cause the switch to open, said first roller moving when the control body is moved about the swivel center point, so that when any one of the plungers is actuated to cause movement of the industrial vehicle the first roller on the actuator bracket moves sufficiently to release the second roller to permit the switch actuator to move to its normal position closing the switch.

11. The improvement of claim 10, wherein there is an alarm member coupled to the switch.

12. The improvement of claim 10, wherein the axis of the first roller lies on a plane passing through the center of swivel and bisecting the second roller when the control body is in its centered position.

13. The improvement of claim 12, wherein the axis of the second roller lies on a plane passing through the center swivel point of the control body and bisecting the first roller.

14. The improvement of claim 10, wherein said pilot valve has four plungers arranged in a square pattern with the plungers being at corners of the square, the center of swivel of the swivel connection being positioned at the intersection of planes defined by the axes of the plungers and extending diagonally across the square, said control body having positions to selectively actuate the plungers individually, and in pairs of plungers along the sides of the square pattern, with the first roller of the actuator bracket moving away from the second roller on the switch actuator sufficiently to permit the switch to move to its normal position in each of the positions of the control body.

* * * * *